United States Patent
Giannuzzi et al.

[11] Patent Number: 5,575,600
[45] Date of Patent: Nov. 19, 1996

[54] ALL-METAL EXPANSIBLE ANCHOR AND NAIL ASSEMBLY

[75] Inventors: Louis N. Giannuzzi, Greenwich, Conn.; Anthony C. Giannuzzi, 59 Dingletown Rd., Greenwich, Conn. 06830

[73] Assignee: Anthony C. Giannuzzi, Greenwich, Conn.

[21] Appl. No.: 499,928

[22] Filed: Jul. 10, 1995

[51] Int. Cl.$^6$ .................................................. F16B 13/06
[52] U.S. Cl. ................................. 411/48; 411/45; 411/60; 411/69
[58] Field of Search .................................. 411/45, 46, 48, 411/55, 57, 60, 446–448, 69

[56] References Cited

U.S. PATENT DOCUMENTS

| | | | |
|---|---|---|---|
| 4,263,833 | 4/1981 | Loudin et al. | 411/55 X |
| 4,610,587 | 9/1986 | Wollar et al. | 411/60 |
| 4,871,289 | 10/1989 | Choiniere | 411/48 |
| 5,030,051 | 7/1991 | Kaneko et al. | 411/48 X |
| 5,221,167 | 6/1993 | Girkin et al. | 411/45 |

FOREIGN PATENT DOCUMENTS

| 3045986 | 6/1992 | Germany | 411/45 |
|---|---|---|---|

Primary Examiner—Neill R. Wilson
Attorney, Agent, or Firm—Michael Ebert

[57] ABSTRACT

An all-metal expansible hollow anchor and nail assembly adapted to fasten to masonry a fixture or other object having a mounting hole. The anchor which goes through the fixture mounting hole into a hole drilled in the masonry, is provided with a head that then engages the fixture and an expansible body projecting from the head into the drilled hole whereby when the nail is driven into the hollow anchor, the anchor body then expands against the wall of the hole to lock the anchor therein. The expander nail has a head whose diameter is greater than that of the drilled hole and a shank of smaller diameter joined to the underside of the nail head by a junction section of progressively increasing diameter whereby the shank gradually merges with the head. Countersunk in the head of the anchor is a well that conforms to the shape of the nail head and the junction section, the well receiving and nesting the nail head and junction section when hammer blows are applied to the nail head. The force of these blows is transferred by the nail head and the junction section to the surrounding region in the anchor head to develop compressive stresses therein that act to retard further advance of the nail and to prevent the production of shear stresses that may cause the anchor head to separate from the body of the anchor.

12 Claims, 2 Drawing Sheets

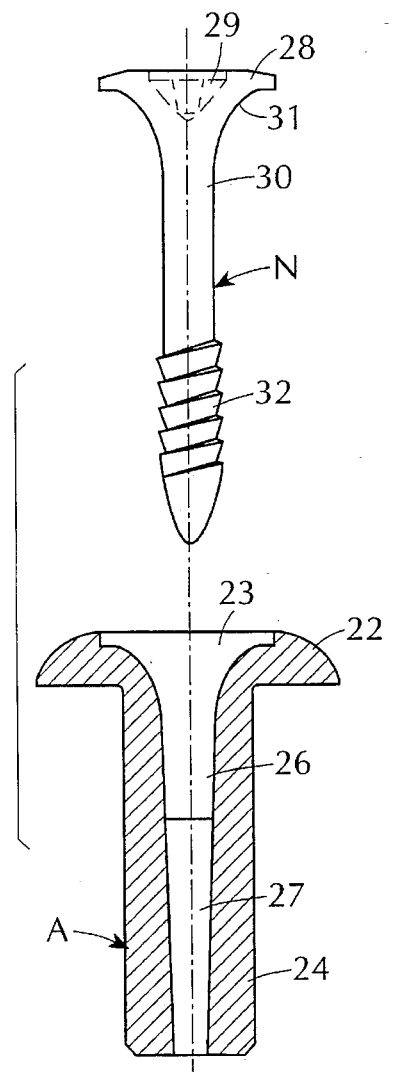
FIG. 2
FIG. 3
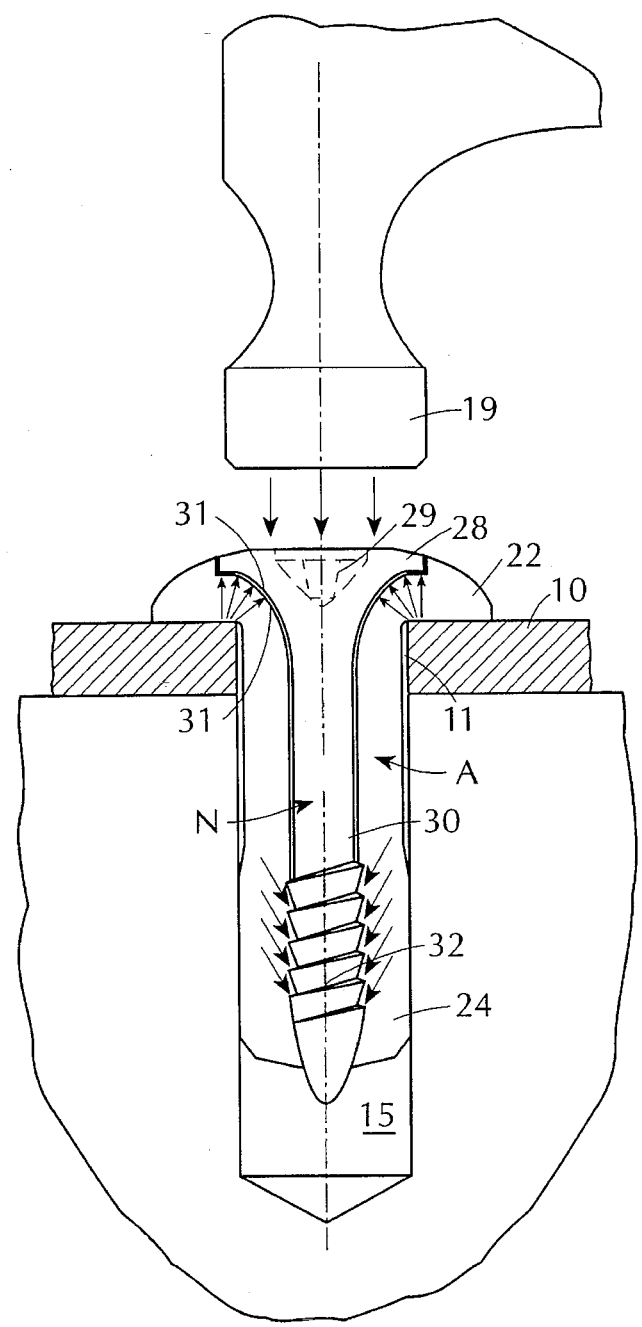
FIG. 4
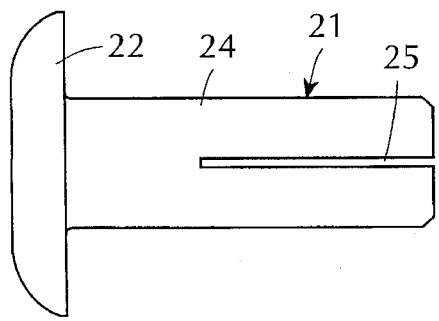

ALL-METAL EXPANSIBLE ANCHOR AND NAIL ASSEMBLY

BACKGROUND OF INVENTION

1. Field of Invention

This invention relates generally to an expansible anchor and expander nail assembly insertable into a hole drilled in masonry to fasten an object thereto, and more particularly to an all-metal assembly of this type in which the expander nail is hammered into a hollow metal anchor to expand it within the drilled hole to lock the anchor therein and in which excessive hammering is not damaging to the anchor.

2. Status of Prior Art

It has long been known to secure an object to brick or other form of masonry by means of an expansible hollow anchor having a head and a divided or split body extending from the head, which body is expanded when a pin or nail is driven therein. Thus the Hottenroth U.S. Pat. No. 1,138,219 discloses an expansible hollow anchor which is inserted through a mounting hole in the object to be fastened into a hole drilled in brick or tile. When a pin is then hammered into the hollow of the anchor, it acts to spread the divided body against the wall of the drilled hole to lock the anchor therein and thereby fasten the object to the brick or tile.

The concern of the present invention is with an expansible metal anchor and nail assembly in which the anchor is formed of cast zinc or of a metal having similar characteristics. Of greatest prior art interest therefore is the commercially available anchor and nail assembly being marketed by The Rawlplug Company, Inc. of New Rochelle, N.Y. under the trademark ZAMAC NAILIN.

A NAILIN assembly is constituted by a rivet-shaped hollow anchor having a head and a split cylindrical body extending therefrom, the anchor being fabricated of a zinc alloy resistant to corrosion. The expansion device for this anchor is a nail of plated steel or stainless steel, depending on the degree of corrosion resistance required.

The NAILIN assembly is useable in concrete, block, brick, stone or any other form of masonry to fasten a fixture or other object thereto having a mounting hole. A hole is drilled in the masonry having the same nominal diameter as the cylindrical body of the anchor. The anchor is then inserted through the mounting hole of the fixture into the drilled hole and gently tapped until the head of the anchor is set tightly against the fixture. Then the expander nail is hammered into the hollow zinc anchor to expand the body of the anchor. When fully hammered in, the head of the nail which goes into a countersunk well in the mushroom-shaped head of the anchor is then flush with the anchor head.

A NAILIN anchor and nail assembly, as well as those having a similar structure, is an effective fastening device, but only when carefully installed. But when improperly installed as is often the case, this anchor assembly then has serious shortcomings. Since the expander nail is easily driven forward by a hammer, it is common practice for an installer to overdrive the head of the nail into the head of the anchor. When therefore the head of the nail is excessively struck by the hammer, the nail head advances to force zinc in the head of the anchor to extrude into the mounting hole of the fixture surrounding the junction of the anchor head and the body of the anchor. This forced extrusion develops shear stresses in the metal of the anchor within its head. As a consequence of these shear stresses, the head of the anchor will in a relatively short time period separate from the anchor body and the fixture will then become unfastened from the masonry.

Another drawback of a conventional expansible metal anchor and nail assembly is that its holding power is mainly determined by the tensile strength of the cross-sectional area of the metal body of the anchor adjacent its head. The exterior surface of the nail shank is smooth, and while this shank functions to expand the anchor body, it does not act to enhance its tensile strength. Hence the holding power of a conventional anchor is limited.

A third disadvantage of a conventional assembly is that the expander nail, when driven into the anchor, then has its head submerged in the countersunk head of the anchor; hence it cannot be withdrawn therefrom. Should it later become necessary to remove the fastened fixture from the masonry, it is not possible to do so except by drilling out the nail.

Also commercially available is a NYLON NAILIN assembly whose anchor is molded of nylon and whose nail is formed of steel or stainless steel. The drawbacks of a NYLON NAILIN assembly are similar to those encountered with an all metal ZAMAC NAILIN assembly.

SUMMARY OF INVENTION

The main object of this invention is to provide an improved expansible all metal anchor and expander nail assembly for fastening a fixture or other object to masonry which overcomes the drawbacks associated with prior assemblies.

More particularly, an object of this invention is to provide an improved assembly in which the integrity and tensile strength of the anchor is maintained even when excessive force is used to hammer in the expander nail and stresses are then developed in the anchor head.

A significant advantage of an assembly in accordance with the invention is that it may be installed correctly without difficulty, for the installer is free to use excessive force to hammer the nail into the anchor without producing adverse effects.

Still another object of the invention is to provide an assembly of the above type in which the leading end of the nail shank is externally threaded to define a screw section, and the head of the expander nail is adapted to receive the blade of a screw driver so that the nail may be screwed out of the anchor to unfasten the fixture.

Also an object of the invention is to provide an assembly of the above type which may be mass produced at low cost.

Briefly stated, these objects are attained by an all-metal expansible hollow anchor and nail assembly adapted to fasten a fixture or other object having a mounting hole to masonry. The anchor which is inserted through the mounting hole into a hole drilled in the masonry, is provided with a head which then engages the fixture and an expansible body projecting from the head into the drilled hole whereby when the nail is driven into the hollow anchor, the anchor body then expands against the wall of the hole to lock the anchor therein.

The expander nail has a head whose diameter is greater than that of the drilled hole and a shank of smaller diameter joined to the head by a junction section of progressively increasing diameter whereby the shank gradually merges with the head. Countersunk in the head of the anchor is a well that conforms to the shape of the nail head and the junction section, the well receiving and nesting the nail head and junction section when hammer blows are applied to the nail head. The force of these blows is transferred by the nail head and the junction section to the surrounding region of the anchor head to develop compressive stresses therein that act to retard further advance of the nail and to prevent the production of shear stresses that may cause the anchor head to separate from the body of the anchor.

The head of the nail is provided with an indented socket to receive the blade of a screwdriver, and the leading end of the nail shank is externally-threaded to define a screw section having sharp edged threads that cut into the hollow body of the anchor after the nail shank is driven therein, thereby interlocking the shank to the anchor body to enhance the holding power of the assembly. Should one wish to detach the assembly and unfasten the fixture from the masonry, the expander nail is then unscrewed from the installed anchor.

BRIEF DESCRIPTION OF DRAWINGS

For a better understanding of the invention reference is made to the detailed description to follow which is to be read in conjunction with the accompanying drawings wherein:

FIG. 2 shows the components of an anchor and nail assembly in accordance with the invention, the anchor being shown in section;

FIG. 3 is a separate view of the anchor; and

FIG. 4 shows the assembly in accordance with the invention being installed and the forces produced by the blows of the hammer.

DETAILED DESCRIPTION OF INVENTION

Figure 1:
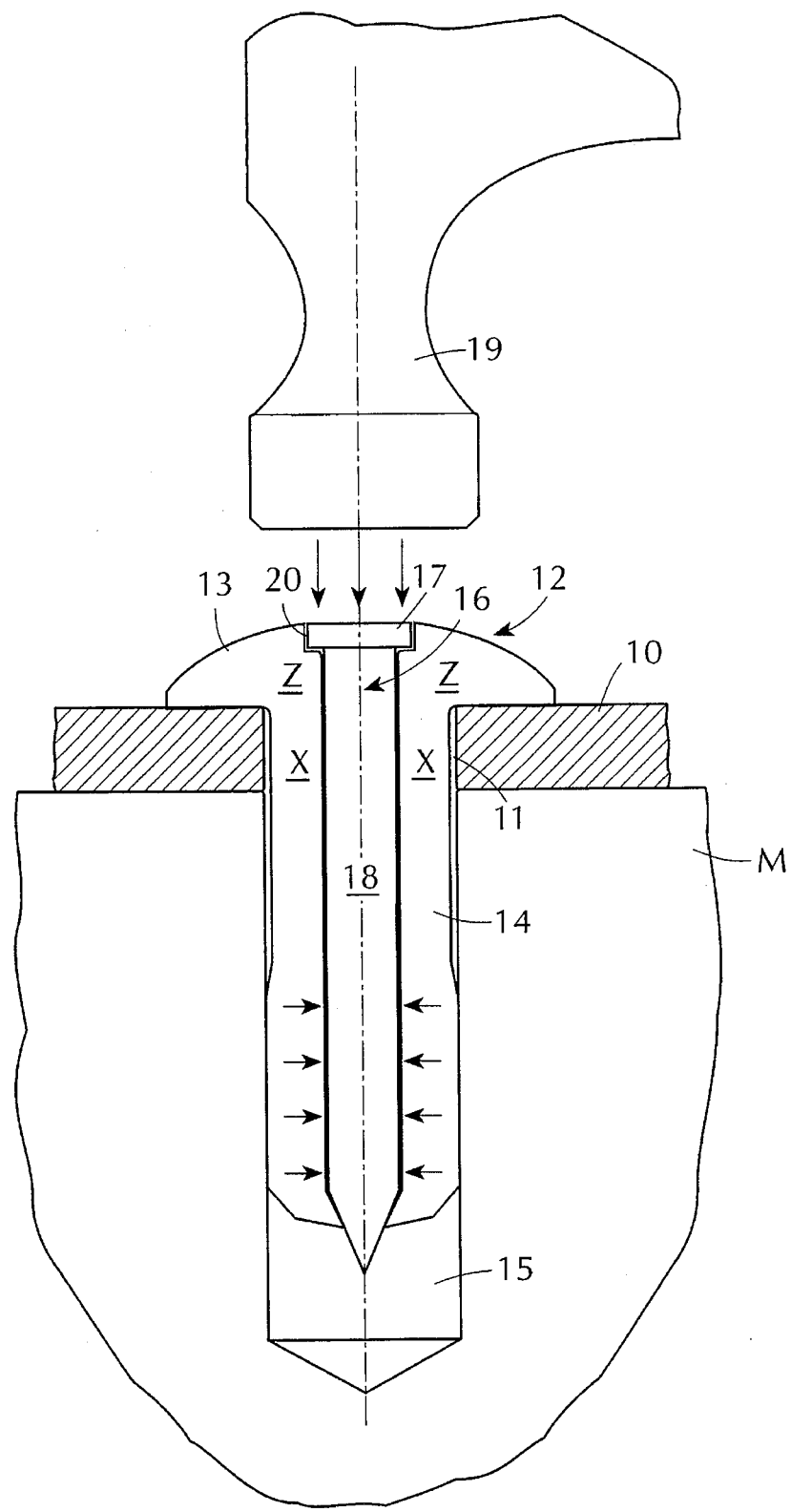
FIG. 1 illustrates a prior art anchor and expander nail assembly being installed in a hole drilled in masonry to fasten a fixture thereto.

Prior Art:

FIG. 1 shows a typical prior art expansible metal anchor and expander nail assembly adapted to fasten a fixture or other object 10 having a mounting hole 11 to the outer surface of a concrete wall M or other form of masonry. The assembly includes a rivet-shaped anchor 12 formed of zinc or other relatively soft metal having a mushroom-shaped head 13 from which extends a cylindrical body 14 which is slitted or divided so that it can be expanded by the expander nail.

Anchor 12 is inserted through the mounting hole 11 of the fixture into a hole 15 drilled in masonry M by means of a carbide drill bit. When the anchor is so inserted in the drilled hole its head 13 then engages the outer surface of fixture 10. The assembly further includes an expander nail 16 formed of steel or other metal that is harder than the metal of the anchor. Nail 16 has a cylindrical head 17 of a diameter much smaller than that of the anchor head 13, and a shank 18 extending from the nail head.

When nail 16 is driven into the hollow anchor by the head 19 of a hammer, the shank 18 of the nail then acts to expand the split anchor body 14 so as to spread it apart against the wall of the drilled hole 15 in the masonry, to thereby lock the anchor in place. When nail 16 is fully driven in, its small head 17 is then nested in a well 20 countersunk in the head 13 of the anchor.

When this prior art assembly is properly installed, the installer stops hammering at the point where head 17 of the nail lies with the well 20 of the anchor head so that the surface of the nail head 17 is then flush with that of the anchor head 13.

Since it takes little effort to drive the expander nail 16 into the hollow anchor, there is a tendency on the part of many installers to overdrive the nail by excessive hammering. Because the diameter of the nail head is smaller than that of a typical hammer head, once the head of the nail is nested in the countersunk well 20 in the anchor head, the hammer head 19 then proceeds to strike not only the nail head 17 but also the region of the anchor head 13 surrounding the nail head. As a consequence, as the head 13 of the anchor is repeatedly struck by the hammer, the metal of the anchor head is extruded downwardly into the region of the head identified in FIG. 1 as zone Z.

As a consequence of this extrusion, sheer stresses are developed in the zinc within zone Z. These sheer stresses, in a fairly brief time period, will cause the anchor head 13 to separate from the anchor body, thereby unfastening fixture 10 from the masonry M.

The pull out strength or holding power of this prior art anchor is basically limited to the tensile strength of the cross-sectional area of the zinc metal in zone X of the anchor body below head 13. The expander nail 16 driven into the anchor body does not to any substantial degree contribute to the tensile strength of the assembly, for the nail only serves to expand the anchor body.

Because the shank of the nail is smooth, it does not interlock mechanically with the body of the anchor into which it is driven. And once the nail is driven in, so that its head is submerged in the head of the anchor, it is no longer possible to pull the nail out of the anchor in order to unfasten the fixture. Thus a prior art anchor and nail assembly of the type illustrated in FIG. 1 leaves much to be desired in regard to holding power and other requirements for an effective fastening device.

The Invention:

An all-metal expansible anchor and nail assembly in accordance with the invention, as shown in FIGS. 2, 3 and 4 consists of a rivet-shaped hollow anchor A, preferably die-cast of a corrosion resistant zinc alloy, and an expander nail N, preferably formed of steel.

Anchor A is provided with a mushroom-shaped head 22 having a well 23 countersunk therein to accommodate the head of the nail and a junction section of the nail shank just below the head. Extending from the flat underside of anchor head 22 is a cylindrical body 24 whose leading portion is split by a slit 25 so that it may be expanded by the nail driven therein.

Anchor A is provided with a longitudinal bore having an upper section 26 of uniform diameter which merges with the countersunk well 23 in the anchor head, and a lower section 27 that extends through the leading portion 24 of the body and is gently tapered. When nail N is driven into the hollow of the anchor so that it extends into the tapered bore section 27, the nail then acts to spread apart the slitted leading portion of the anchor body against the bank of hole 25 drilled in the masonry.

Nail N is provided with an enlarged head 28 having a diameter which exceeds that of hole 15 drilled in the masonry, and is large enough to afford a full-strike surface for a typical hammer. Hence when head 28 of the nail is seated in the well 23 of the anchor head 22, and is flush with this head, the hammer head can still continue to strike the head 28 of the nail and not head 22 of the anchor.

Formed in head 28 of the nail is an indented socket 29 to receive the blade of a screwdriver or other tool for turning out the nail from the anchor as if it were a screw.

Nail N is provided with a shank whose upper portion 30 is of uniform diameter and is joined to the underside of head 28 by a junction section 31 of generally progressively greater diameter so that the shank gradually merges with the shank, rather than abruptly as in the prior art nail.

The junction section 31 of the nail which in the form illustrated has a generally conical shape is integrated with head 28 and shank 30. Section 31 may also have a concave curvature so that the section has a tulip-like formation.

The leading end portion of the nail shank is externally threaded to define a screw section 32. Screw section 32 has a long, sloping flank which merges with the conical tip of the steel shank to allow the steel shank to enter the hollow of the zinc anchor without to any significant degree chiseling the softer zinc body of the anchor. The thread of the screw section has sharp edges so that as shown in FIG. 4, when nail N is driven into the body of anchor A to expand it against the bank of the hole 15 drilled in the masonry, the threads then bite into the soft zinc of the expanded anchor body, thereby mechanically interlocking the nail and the anchor. Because the forward end of the nail is interlocked with the anchor, the shank of the nail functions as a load-bearing member and effectively reinforces the tensile strength of the installed anchor, thereby enhancing the holding power of the assembly.

The shape of well 23 in head 22 of anchor matches that of nail head 28 and junction section 31 joining the nail shank 30 to the nail head. Hence when the nail is fully driven into the anchor by a hammer as shown in FIG. 4, the head of the nail and the underlying junction section 31 are nested in the well 23 in the head of the anchor, the surface of the nail head being then flush with the surface of the anchor head.

This relationship generally reduces the possibility of an installer damaging the head of the anchor during the installation procedure in which nail N is hammered into anchor A. The axially-directed hammer blows imposed on the head of the nail will cause the head 28 of the nail and the non-axial junction section thereunder to which these blows are transmitted to develop, as shown by the arrows in FIG. 4, compressive stresses in the region in the zinc anchor head 22 in contact with the underside of the nail head 28 and junction section 31.

Because the diameter of the enlarged head 28 is greater than that of the hole drilled in masonry, when the nail head 28 is driven by the hammer to nest in the well 23 of the anchor head 22 so that it is now flush with the anchor head, hammer blows thereafter applied, will mainly strike the nail head and not the surrounding region of the anchor head 22.

The compressive stresses developed in the region of the zinc anchor surrounding the underside of the nail head 28 and the concave surface of the junction section 31 effectively compresses the zinc and act to retard further advance of the nail head deeper into the head of the anchor despite repeated blows from the hammer. Since the zinc in the anchor head is not displaced and is not extruded downwardly, no destructive shear stresses are developed as in a prior art assembly.

Anchor bodies are traditionally fabricated of cast zinc. By reason of the necessary economics of die-casting these bodies, parts die-cast of zinc exhibit certain specific mechanical properties. These die-cast zinc parts are rigid and have a low modulus of elasticity which render the parts good in compression and very poor in shear.

The present invention exploits these characteristics of cast zinc by redirecting the internal stresses induced by hammering the nail inserted in the hollow zinc anchor so that no shear stresses are produced and the compressive stresses which are developed act to prevent the advance of the nail head beyond its proper nested position in the anchor head.

Because the shank of the nail N is provided with a screw section, should it become necessary to unfasten the fixture or other object from the masonry, the nail may then be unscrewed from the anchor by means of a screwdriver and the anchor may then be pulled out of the hole drilled in masonry. To facilitate this unscrewing action, the screw section of the nail is preferably coated with a low-friction material such as TEFLON or a UHMW polymer, or it is coated with wax or another solid lubricant.

Advantages:

As noted previously, the sloped flank of screw section 32 of the nail shank prevents this section from chiseling away the interior surface of the expandable metal anchor as the nail is driven formed by hammer blows, even though the threads of the nail have sharp edges. Should such chiseling occur, then the holding power of the installed assembly would be substantially reduced.

In an assembly of a prior art type in which the expandable anchor is made of plastic material such as nylon, had the steel nail being provided with a threaded section, then when the nail is hammered into the plastic anchor, the plastic would flow away from the nail as the nail was driven forward.

Also with a plastic anchor, because the plastic material can flow without shearing, this plastic anchor does not manifest the same problem of possible head damage as does a die-cast zinc anchor. The excessive hammer blows on the head of the steel nail will not damage the head of the plastic anchor.

But with an all-metal assembly in accordance with the invention in which the anchor is fabricated of rigid, non-flexible zinc incapable of flowing away from the driven-in nail, the structure of the nail is such as to avoid chiseling the body of the anchor as the nail is driven in and to bring about a mechanical interlock of the nail shank and the expanded zinc body.

The driven-in steel nail is therefore in load-bearing engagement with the expanded metal anchor and the installed assembly exhibits exceptional holding power.

While there has been disclosed a preferred embodiment of an anchor and nail assembly in accordance with the invention, it is to be understood that many changes may be made therein without departing from the spirit of the invention.

We claim:

1. A hammer-drivable expansible anchor and nail assembly adapted to fasten an object having a mounting hole to masonry having a hole drilled therein to receive the assembly; said assembly comprising:

A. a hollow metal anchor provided with a head and an expansible body extending from the head having a bore therein insertable through said mounting hole into the drilled hole to cause said anchor head to engage the object and the body to project into the drilled hole, said head having a well countersunk therein; and B. a metal expander nail insertable in the bore of said hollow anchor, said nail being provided with a head adapted to receive blows from the hammer and a shank having a diameter greater than that of the bore joined to the nail head by a junction section of generally progressively greater diameter whereby the shank merges with the nail head, said anchor head well having a shape substantially conforming to that of the nail head and the junction section to nest said nail head and junction section when the nail is driven by hammer blows into the hollow anchor to expand said body against the wall of the drilled hole, whereby hammer blows thereafter applied to the nail head give rise to compressive stresses in a region of the metal anchor surrounding the well therein that retard further advance of the nail and resists the production of shear stresses that may cause the anchor head to separate from the body of the anchor.

2. An assembly as set forth in claim 1, in which said anchor is cast of zinc metal.

3. An assembly as set forth in claim 1, in which the nail is made of steel.

4. An assembly as set forth in claim 1, in which the head of the anchor has a mushroom shape and said nail head has a shape that when the nail head is nested in the well it is then flush with the anchor head.

5. An assembly as set forth in claim 1, in which the body of the anchor is split to render it expansible.

6. An assembly as set forth in claim 1, in which the junction section has a generally conical formation.

7. An assembly as set forth in claim 6, in which said conical junction section has a concave surface.

8. An assembly as set forth in claim 1, in which said nail shank has a leading portion that is externally threaded to define a screw section, and said nail head has an indented socket to receive the blade of a screwdriver whereby the nail may be unscrewed from the anchor in which it is inserted to remove the object from the masonry.

9. An assembly as set forth in claim 8, in which the screw section has a sloped flank to facilitate the advance of the shank into the hollow anchor by hammer blows applied to the nail without chiseling the anchor.

10. An assembly as set forth in claim 8, in which the threads of the screw section have sharp edges, causing these edges to cut into the interior wall of the hollow anchor to effect interlocking of the nail shank with the anchor when the nail is driven therein to expand the anchor.

11. An assembly as set forth in claim 8, in which the screw section is coated with a friction-reducing material.

12. An assembly as set forth in claim 7, in which the screw section has a low friction surface to enhance easy unscrewing from the anchor.

* * * * *